(12) United States Patent
Xiao et al.

(10) Patent No.: US 11,086,855 B1
(45) Date of Patent: *Aug. 10, 2021

(54) ENTERPRISE CONNECTIVITY

(71) Applicant: MicroStrategy Incorporated, Vienna, VA (US)

(72) Inventors: Baoxuan Xiao, Vienna, VA (US); Cezary Raczko, Ashburn, VA (US); Rixin Liao, Herndon, VA (US); Jing Li, McLean, VA (US); Naveen Jayanchandran, Herndon, VA (US); Atul Sharma, Vienna, VA (US); L. Douglas Everhart, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,003

(22) Filed: Jul. 8, 2019

Related U.S. Application Data

(63) Continuation of application No. 15/006,655, filed on Jan. 26, 2016, now Pat. No. 10,366,079.

(60) Provisional application No. 62/108,027, filed on Jan. 26, 2015.

(51) Int. Cl.
  *G06F 16/24* (2019.01)
  *G06F 16/242* (2019.01)
  *G06F 16/248* (2019.01)
  *H04L 29/08* (2006.01)

(52) U.S. Cl.
  CPC ........ *G06F 16/2423* (2019.01); *G06F 16/243* (2019.01); *G06F 16/248* (2019.01); *H04L 67/02* (2013.01)

(58) Field of Classification Search
  CPC ......... G06F 17/30392; G06F 17/30401; G06F 17/30554
  See application file for complete search history.

(56) References Cited

U.S. PATENT DOCUMENTS

| | | |
|---|---|---|
| 5,933,837 A | 8/1999 | Kung |
| 6,697,819 B2 | 2/2004 | Boudreau |
| 6,775,676 B1 | 8/2004 | Briam et al. |
| 7,349,900 B1 | 3/2008 | Qin |
| 7,526,793 B2 | 4/2009 | Andreev et al. |
| 7,962,782 B2 | 6/2011 | Barghouthi et al. |
| 8,478,772 B2 | 7/2013 | Wong |
| 8,756,217 B2 | 6/2014 | Peek |

(Continued)

*Primary Examiner* — Loc Tran
(74) *Attorney, Agent, or Firm* — Fish & Richardson P.C.

(57) ABSTRACT

Methods, systems, and apparatus, including computer programs encoded on a computer storage medium, for enterprise connectivity are described. In one aspect, a method includes the actions of receiving, by a data analysis server and from a web client running on a first device, a request to begin a web session, where the data analysis server is configured to generate queries to a data storage device based on user input to the web client. The actions further include receiving a request to generate a dashboard interface that provides a visualization of a portion of data in the data storage device. The actions further include generating the dashboard interface and a corresponding dashboard file that is viewable outside of the web client. The actions further include transmitting the dashboard file to a second device that includes a data analysis application that is configured to view the dashboard file.

20 Claims, 10 Drawing Sheets

(56) References Cited

U.S. PATENT DOCUMENTS

| | | |
|---|---|---|
| 8,914,390 B2 | 12/2014 | Peek |
| 2004/0128150 A1* | 7/2004 | Lundegren ........... G06Q 10/103 |
| | | 705/301 |
| 2006/0074937 A1 | 4/2006 | Bird et al. |
| 2014/0129592 A1 | 5/2014 | Samudrala et al. |
| 2014/0149837 A1 | 5/2014 | Bedard |
| 2014/0149839 A1* | 5/2014 | Bedard ................... G06F 40/18 |
| | | 715/220 |
| 2014/0279837 A1* | 9/2014 | Guo ...................... G06F 16/282 |
| | | 707/603 |
| 2015/0142727 A1* | 5/2015 | Louie ................... G06F 16/248 |
| | | 707/603 |

* cited by examiner

FIG. 1A

ENTERPRISE CONNECTIVITY

CROSS-REFERENCE TO RELATED APPLICATIONS

This application is a continuation of U.S. application Ser. No. 15/006,655, filed Jan. 26, 2016, which claims the benefit of U.S. Application No. 62/108,027, filed Jan. 26, 2015. Both of these prior applications are incorporated by reference in their entirety.

TECHNICAL FIELD

This disclosure relates to data access and processing.

BACKGROUND

A database is a collection of information that may include data, raw numbers, and text, and other similar data. Users may interact with and retrieve data from a database by querying the database.

SUMMARY

According to an innovative aspect of the subject matter described in this application, a method for enterprise connectivity includes the actions of receiving, by a data analysis server and from a web client running on a first device, a request to begin a web session, where the data analysis server is configured to generate queries to a data storage device based on user input to the web client; receiving, by the data analysis server and from the web client running on the first device, a request to generate a dashboard interface that provides a visualization of a portion of data in the data storage device; generating, by the data analysis server, the dashboard interface and a corresponding dashboard file that is viewable outside of the web client; and transmitting, by the data analysis server, the dashboard file to a second device that includes a data analysis application that is configured to view the dashboard file.

These and other implementations can each optionally include one or more of the following features. The data analysis server is configured to generate SQL queries based on natural language user input. The dashboard file is configured to provide the visualization of the portion of the data in the data storage device without requiring the second device to connect to the data storage device. The data analysis application is configured to run outside of a browser. The action of receiving the request to generate the dashboard interface that provides the visualization of the portion of the data in the data storage device includes receiving one or more user identifiers of users who are authorized to receive the dashboard file. The action of generating the dashboard interface and the corresponding dashboard file that is viewable outside of the web client includes receiving a request to export the dashboard interface to a format that is viewable by the data analysis application.

The actions further include receiving, by the data analysis server, a user defined data set and a request to store the user defined data set locally on the data analysis server, where in the user defined data set is data identified by a user; receiving, by the data analysis server and from the data analysis application running on the second device, a request to generate another dashboard interface that provides a visualization of the user defined data set; and generating, by the data analysis server, the other dashboard interface and a corresponding other dashboard file that is viewable outside of the data analysis application. The actions further include generating, by the data analysis server, a schema that includes a mapping of objects to the data stored in the data storage device; receiving, by the data analysis server and from the data analysis application running on the second device, a request to generate another dashboard interface that provides a visualization of objects in the schema; and generating, by the data analysis server, the other dashboard interface and a corresponding other dashboard file that is viewable outside of the data analysis application. The dashboard file includes the portion of data in the data storage device. The dashboard file includes additional data specified by a user. The action of generating the dashboard interface and a corresponding dashboard file that is viewable outside of the web client includes based on the queries to the data storage device, identifying additional data that is different than the portion of data in the data storage device; and including the additional data in the dashboard file.

Other embodiments of this aspect include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B illustrate example user interfaces.

DETAILED DESCRIPTION

Techniques are described for creating, using, and managing a system with enterprise connectivity. The system allows users to access and interpret data stored in a data storage device by interacting with a data analysis server instead of directly with the data in the data storage device. The users may create dashboard interfaces that are visualizations of data stored in the storage device. The users may create these dashboard interfaces by logging into the data analysis server through a web client or outside of a web client by using a data analysis application. The users may export the dashboard interface by creating a dashboard file that can be shared with other users. Users who log into the data analysis server through a web client may view and edit dashboard files exported from the data analysis application. Similarly, users of the data analysis application may view and edit dashboard files exported from the web client.

Figure 1:
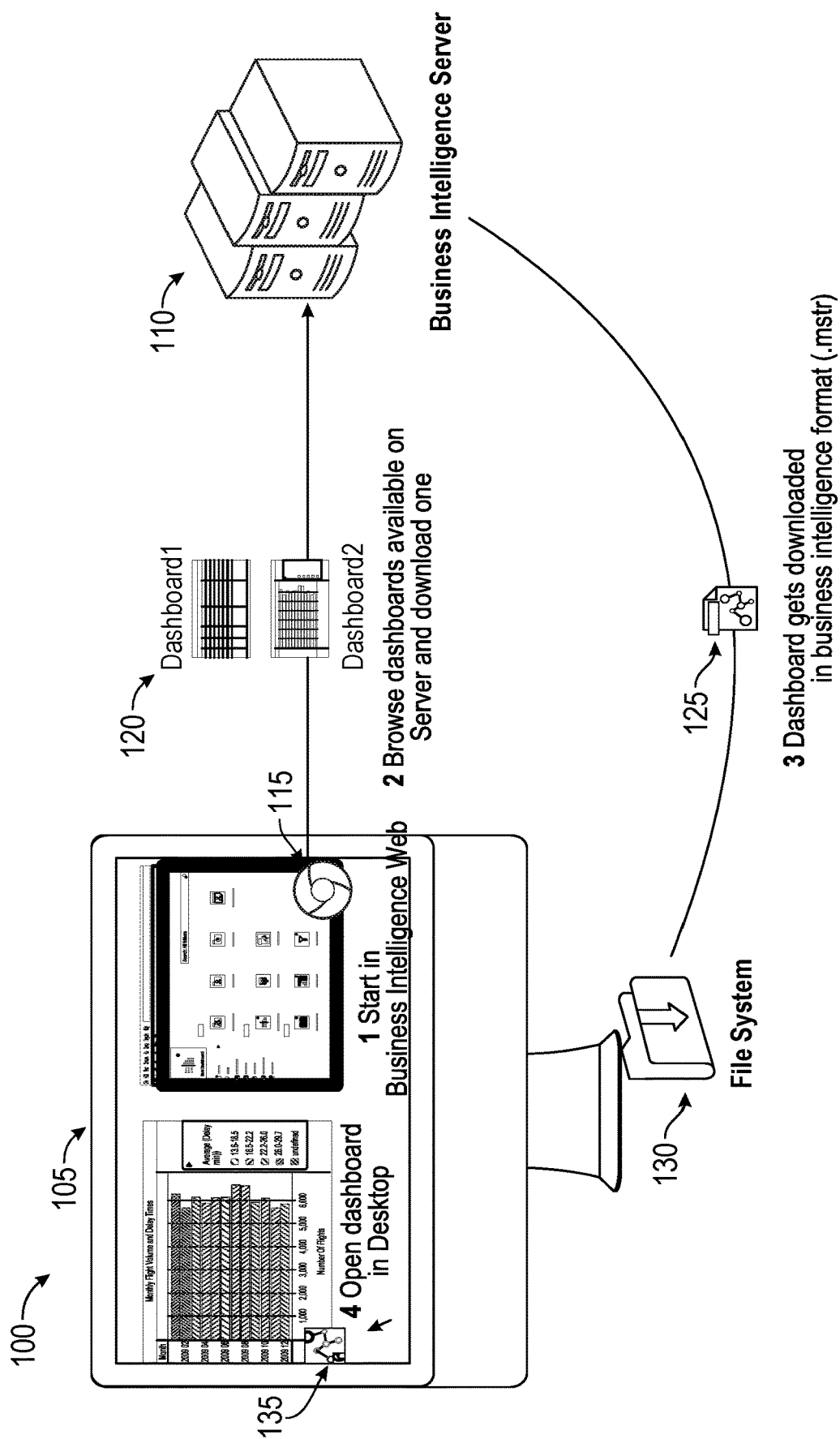
FIG. 1 is a diagram illustrating an example system for enterprise connectivity.

FIG. 1 is a diagram of an example system 100 for enterprise connectivity. System 100 includes a computing device 105 that accesses a data analysis server 110. The computing device 105 may be any type of device that is configured to execute a web browser 115 and access a server. For example, the computing device 105 may be a desktop computer, laptop computer, tablet, mobile phone, or any similar device. The data analysis server 110 is a server that is accessible through a web interface. The data analysis server 110 provides an interface between the web interface and a data storage device. The data analysis server 110 provides a metadata layer between the web interface and the data storage device. The data storage device may contain raw data, tables, documents, spreadsheets, databases, or any other type of electronic file. The data storage device may be located locally with the data analysis server 110 or remotely.

The data analysis server 110 receives input from the browser 115 and generates, using the metadata, a query, to the data storage device, that the data storage device can understand. For example, a user may log into the data analysis server 110 through the browser 115 and wish to access sales data. The user may enter "revenue for previous year" into the web interface. The data in the data storage device may be contained in many different formats and may not use the term "revenue." Instead some data may be contained in a table with the label "sales price," in a data base with the label "cost of goods sold," or in a spreadsheet with the label "total value." The data analysis server 110 generates a query, such as an SQL query, to the data storage device to retrieve the data relevant to "revenue for previous year." The data analysis server 110, then provides the revenue data to the web interface for displaying to the user. The revenue data may be presented in a visual format such as a chart, graph, table, list, or any other data format that the user may select.

The user may enter several requests to the data analysis server 110 and with each request, the user may add the visualizations of the request to a dashboard interface 120. The dashboard interface 120 is a collection of visualizations of requests that a user has sent to the data analysis server 110. Sample dashboard interfaces 120 may be preconfigured by the data analysis server 110 and selected and edited by a user. A dashboard interface 120 may display visualizations of the data at the time the user made the request to the data analysis server 110, or the dashboard interface 120 may provide an option to refresh the data. If the data is refreshed, then the dashboard interface 120 would have to make a new request to the data analysis server 110. As an example of a dashboard interface 120, a user may wish to display sales charts for each department. The user may request, from the data analysis server 110, sales for toys, sales for clothing, sales for home goods, and sales for hardware. The user may populate a dashboard interface 120 with a chart for each that shows the sales data over the past five years.

A user may save the dashboard interface 120 on the data analysis server 110 for future access or for another user to access. The user may specify the other users who may access the dashboard interface 120. When those users log into the data analysis server 110, they may view the dashboard interface 120, refresh the dashboard interface 120, add or remove data visualizations to the dashboard interface 120. In some implementations, the user may make the dashboard interface 120 read only to particular user so that the other users may not edit the dashboard interface 120.

A user may export the dashboard interface 120 to a dashboard file 125. The dashboard file 125 may be accessible to users independent of the data analysis server 110. For example, the user may create the dashboard interface 120 and instead of saving the dashboard interface in the data analysis server 110 for other users to view by logging into the data analysis server 110, the user may export the dashboard interface 120 to a dashboard file 125 and send the dashboard file 125 to other users. Another user who receives the dashboard file 125 may store the dashboard in a file system 130 that is either local, on a local network, or remotely and access the view the dashboard interface 120 by opening the dashboard file 125 in a data analysis application 135. The data analysis application 135 may be installed on a computing device such as computing device 105. The data analysis application 135 does not require a web interface to open the dashboard file 125 and may not have access to the data analysis server 110. The dashboard file 125 contains metadata that defines how to manipulate the data retrieved from the data storage device. Continuing with the example of the dashboard interface related to sales, the user who opens the dashboard file 125 may refresh the data, filter the data, or create new data visualizations with data that is accessed by the dashboard file 125. The sales data may be included in the dashboard file 125 or opening the dashboard file 125 may cause the system to access the sales data in the data storage device.

The user who exported the dashboard file 125 may place restrictions on the file with regards to the other users who can open, view, or manipulate the dashboard interface 120. In some implementations, the data analysis application 135 can access the data storage device. The data analysis application 135 may contain metadata similar to the data analysis server 110 or may contain a limited version of the metadata. A user may be able to input a request to the data analysis application 135 that will formulate a query for the data storage device. As an example of the metadata, the data analysis application or data analysis server may include details related to the data stored in the data storage device such as sales data. The metadata may point to sales data overall and specify which of the sales data is attributable to a specific region, such as the north or south region. The metadata may then further specify in each region, the data that is related to sales for particular stores.

As discussed below, a dashboard can include content that is based on data sources maintained or hosted by remote systems, such as data analysis server 110. Interaction with a dashboard may cause different information to be requested from the server 110 and used to populate or generate information shown on the dashboard.

Various techniques may be used to allow a user to create, view, or edit a dashboard offline, then later have the dashboard seamlessly updated to reflect current, online data. For example, a user of a computing device 105 may design a dashboard that references or relies on data from data sources provided by the data analysis server 110, even though the computing device 105 does not currently have a network connection to a data analysis server 110. Then, when network connectivity is available, the dashboard may be updated to reflect the data from the referenced data sources.

To facilitate the offline generation and use of dashboards, the computing device 105 may locally cache subsets of information from the data analysis server 110. For example, a user may initially specify one or more data sources of interest, and the computing device 105 may request, receive from the data analysis server 110, and store portions of those data sources at the computing device 105 for offline use. This may include example data, such as 5% or 10% of the data in a data source identified. Alternatively, the complete records of a specified set of data sources may be acquired and cached. By using cached data, the performance of calculations for dashboard elements can also be improved compared to operations that rely on network transfers.

Similarly, the computing device 105 may store data source definitions for a wide variety of data sources. For example, the data source definition files may list the different data sources that would be available to the user when online, even if none of the actual data from the data sources are cached. The data source definition files can also indicate the data types for each data source, for example, an indication of what different columns of a database represent, both in terms of data format (e.g., text, integer, floating point value, etc.) and the meaning of the data (e.g., whether the value represent a date, a location, revenue, profit, and so on).

As an example, a user could create a table, graph, or other dashboard element and specify one or more data sources to use when populating the element. The computing device 105 may then generate the dashboard element, with references to the correct data source that is not currently available, by accessing the data source definition for the data source. In some implementations, the computing device 105 may show cached data or placeholder data, of the same type as the actual data source, to help the user visualize the overall look of the dashboard. Once the user regains network connectivity, or if the user shares the dashboard with another user that has network connectivity, the data from the data source is retrieved from the data analysis server 110 and is seamlessly incorporated into the dashboard.

While offline, the computing device 105 may receive user input that specifies a selection of elements to include in the dashboard, as well as, layout, formatting, sizing, or other information about how the dashboard should appear or interact with a viewer. A user can filter, pivot, re-sort, or apply other changes to data, even though the data is not currently available, and the changes can be retained and applied to the actual data when it becomes available. Thus the computing system 105 can update the structure and appearance of a dashboard, and save those changes, separate from the operations to show the characteristics of data within the dashboard.

A dashboard can include, or be sent with, cached data that represents information from data sources at a particular point in time. For example, a dashboard may be associated with a data snapshot having all the data relied on to populate the elements of the dashboard. Beyond including simply the values visible on the dashboard, the data snapshot can include the underlying records (e.g., database entries) that visible metrics were generated from, thus allowing updates to be shown in response to a user filtering data, drilling down on certain categories, or otherwise interacting with the dashboard. As a result, a dashboard that is sent from one user to another can define a specific data context that represents the state of certain data sources at a particular point in time. In some implementations, the dashboard does not include the actual data corresponding to the particular point in time, but instead includes a link, reference, or other identifier allowing a dashboard to be populated with information representing the state of data sources at a particular point in time.

The techniques discussed below can be used to synchronize the content of a shared dashboard across multiple devices and for different users. The dashboard may include metadata that identifies particular data sources and/or portions within a data source (e.g., tables, columns, or records in a database). In some implementations, the data analysis server 110 assigns unique identifiers to different data sources and other objects. By including the appropriate identifier for a data source, the computing system 105 can define a connection to the currently unavailable data source so that the content and appearance of the element will be automatically updated once connectivity is regained. Similarly, the organization, layout, and formatting for the dashboard, specified while offline, is maintained and can be propagated to other copies of the dashboard through the data analysis server 110 once connectivity is regained.

In some implementations, when a user creates or accesses a dashboard, the computing system 105 identifies one or more data sources associated with the dashboard, for example, data sources previously used, data sources indicated by a dashboard template, a default set of data sources, or data sources indicated by user input. The computing system 105 then requests a proper subset of the information of the one or more data sources from the data analysis server 110, receives the requested data, and stores the received data in a local cache.

In some implementations, the computing system 105 receives user input that adds or modifies a dashboard element that requires data from a data source while the computing system 105 does not have access to the data source. In response, the computing system 105 accesses a data source definition for the data source or locally cached data for the data source. The computing system adds or modifies the dashboard element to the dashboard. The computing system 105 also includes metadata including a reference to the data source, where the specified element is configured to update the appearance of the specified dashboard element when current data from the data source becomes available. In some instances, the computing system 105 shows the specified dashboard element, such as a table, chart, or graph, rendered using a limited subset of cached data locally available at the computing system. The reference to the data source can include a unique identifier according to an object identification scheme maintained by the data analysis server 110. Later, the computing system 105 can determine that connectivity to the data analysis server 110 has been restored, and in response, populate the dashboard element. This can involve changing the appearance of the element according to the data, while maintaining formatting, placement, sizing, and other parameters specified while offline. For example, filter parameters or sorting parameters applied while offline are also applied to the new data received when connectivity is regained.

Figure 1A:
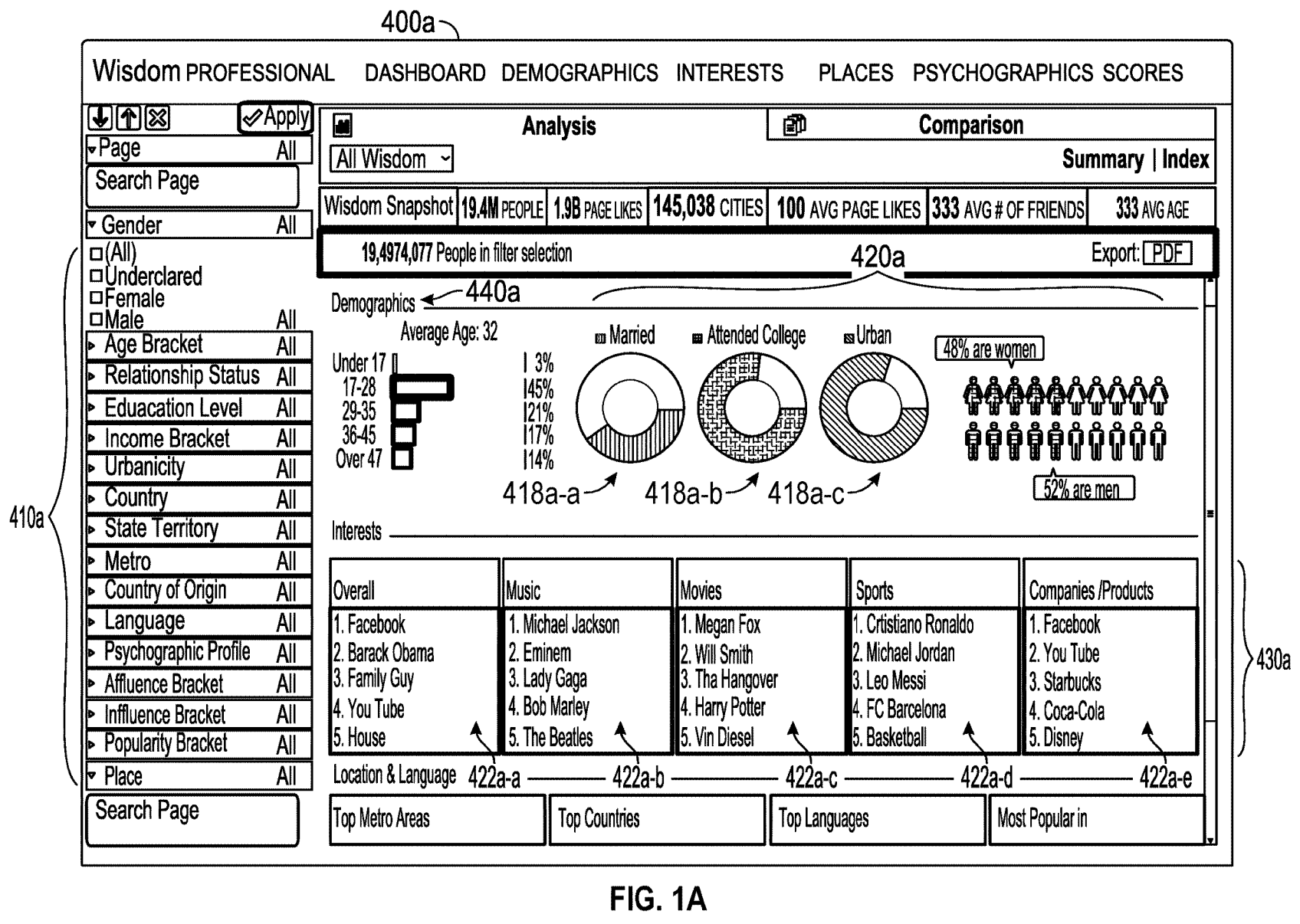
Figure 1B:
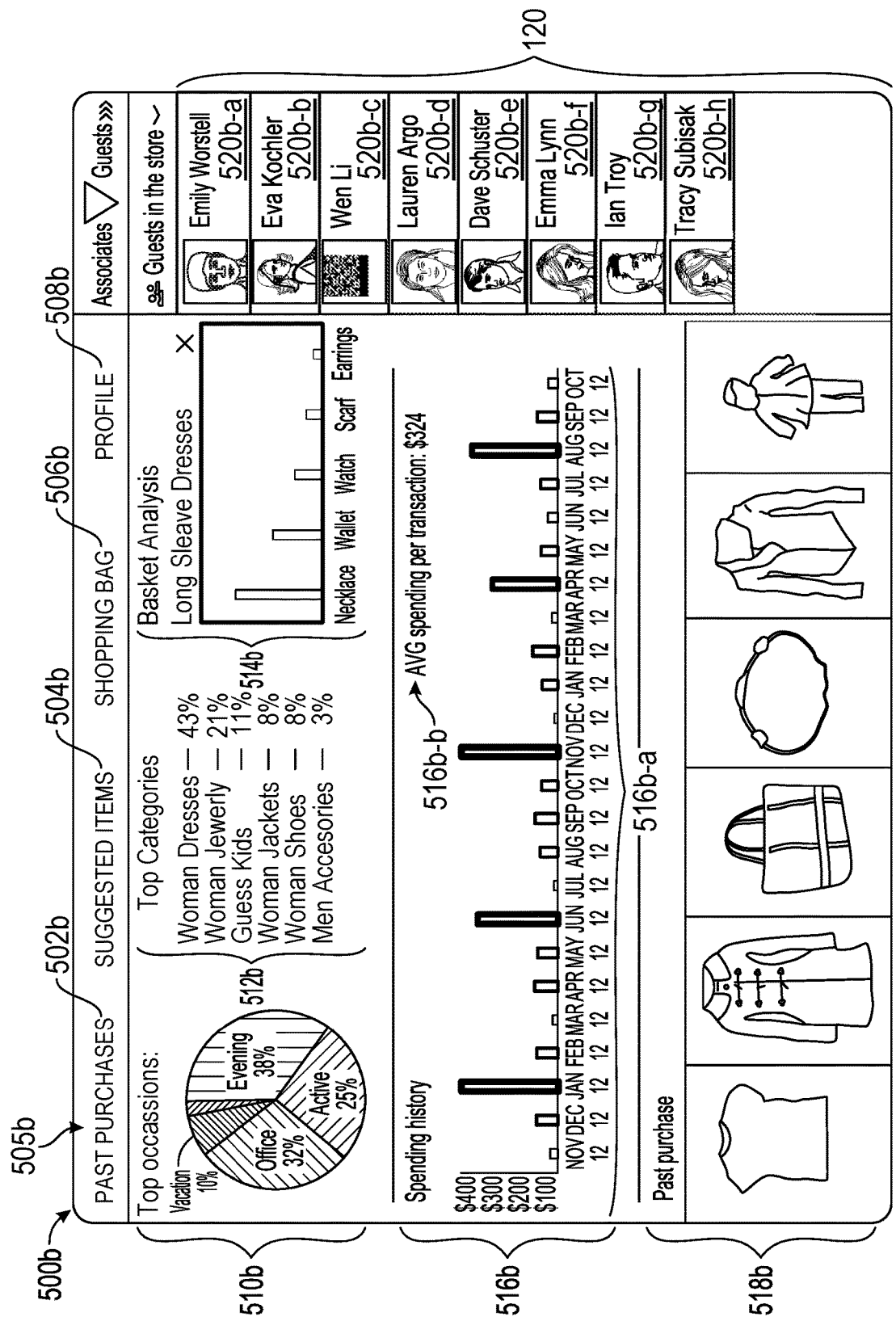

FIG. 1B illustrates an example user interface 400*a* of a dashboard interface. As shown, interface 400*a* comprises a plurality of control objects 410*a*-440*a*. For example, control objects include grids (e.g., data displayed in table format), graphs, text fields, shapes, etc. that users can use to navigate through the data presented through interface 400*a*. Interface 400*a* can be powered by the in-memory analytic data store described throughout this disclosure. In this regard, in some implementations, the analytic data store powers an extensive market intelligence network that provides the data shown in user interface 400*a*. For example, computer systems implementing the techniques described herein uses information about an application and/or design aspects of dashboard 400*a* to generate queries to the in-memory data store.

For example, all of the market intelligence data used by and displayed through the intelligence dashboard interface 400*a* can be loaded into the in-memory analytic data store. In this example, user interface 400*a* receives user input defining filter criteria 410*a* related to the market intelligence information a user seeks. Filter criteria 410*a* can include demographics data or any other type of data as shown in interface 400*a* or otherwise available to filter the market intelligence data stored in the in-memory analytic data store. For example, the user may be able to filter the data by gender, age, relationship status, education level, income bracket, urbanicity, etc. A query execution engine (can receive the user input defining filter criteria 410*a*, and execute queries to access the market intelligence data stored in an in-memory analytic data store. In some examples, the query execution engine can receive the accessed data, perform analytics on the accessed data, and output the results of the analytics to user interface 400a.

As shown in FIG. 1A, the user interface 400a specifies the demographic data used to generate the dashboard output broken down into various categories 420a (e.g., as shown in charts 418a-a, 418a-b, and 418a-c) and outputs ranked lists of interests 422a-a to 422a-e for people that fall within the demographic profile 440a defined by the filter criteria 410a. For example, the categories 420a can include what percentage of the relevant population is married, has attended college, or lives in an urban area. Other types of output and data visualization can be used. In addition, the user interface 400a can receive additional user input to refine or change the filter criteria 410a or the results sought and the user interface 400a can dynamically update in short order given the in-memory data retrieval and processing that occurs responsive to the additional user input.

By way of example, FIG. 1B shows a user interface 500b of an intelligence dashboard also powered by an analytical in-memory data store. Interface 500b displays a customer report 505b to, e.g., a sales associate in a retail store. In an example, the sales associate can view the customer report 505b on a store computer.

In some examples, graphical user interface 500b includes customer portion 520b that displays information indicative of customers who are, e.g., in a particular geographic location (say, the retail store). Customer portion 520b displays customer information 520b-a to 520b-h, with each item of customer information 520b-a to 520b-h representing a customer. A user can select customer information 520b-a to 520b-h by, for example, using a mouse to click on, or using a touch screen display to touch, a desired item of customer information 520b-a to 520b-h. When an item of customer information 520b-a to 520b-h is selected, interface 500 displays information pertaining to the selected customer. In the interface 500 of FIG. 5, a viewer of graphical user interface 500, e.g., the sales associate, has opted to view information associated with the customer represented by customer information 520a.

A query execution engine can receive the user input, e.g., selection of customer information 520b-a to 520b-h, and execute queries to access the market intelligence data stored in an in-memory analytic data store. In some examples, the query execution engine can receive the accessed data (e.g., data from the in-memory analytic data that complies with the filter criteria 410a), perform analytics on the accessed data, and output the results of the analytics to user interface 500b.

As shown, interface 500b includes past purchases link 502b, selection of which causes interface 500b to display information indicative of past purchases of the customer that is selected via customer portion 520b. Interface 500b also includes suggested items link, selection of which causes interface 500b to display suggestions information 504b indicative of suggested items that a particular customer (e.g., the customer selected from customer portion 520b) may be interested in and want to purchase. Suggestions information 504b can based on analyzing data that is retrieved from an in-memory analytic data store. For example, suggestions information 504b can be based on customers' past purchases. Interface 500b includes shopping bag link 506b, selection of which causes graphical user interface 500b to display items that a particular customer wishes to purchase. Interface 500b includes profile link 508b, selection of which causes interface 500b to be updated to display a customer profile of a particular customer (e.g., the customer selected via currently present customer portion 520b).

Interface 500b includes top occasions portion 510b that displays information (e.g., a graph) indicative of the top occasions for which a particular customer (e.g., customer 520b-a) has purchased merchandise. Information for top occasions portion 510b can be generated based on analytics performed on market intelligence data contained in an in-memory data store. In this example, top occasions portion 510b is generated by tracking past purchases of the customer and then categorizing the types of purchase (e.g., based on various occasions). In another example, top occasions portion 510b displays information indicative of the top occasions for a group of customers, e.g., rather than displaying the top occasions for a particular customer.

Interface 500b also displays top categories information 512b, e.g., information specifying top categories of goods that have been purchased by a particular customer and/or by a group of customers at a retail store. Information for top categories portion 510b can be generated based on analytics performed on market intelligence data pertaining to the particular customer and/or the group of customers contained in an in-memory data store. In some implementations, interface 500b can include basket analysis portion 514b—for display of information indicative of types of goods that are currently in an electronic shopping cart of a customer.

Graphical user interface 500b also includes spending history portion 516b to display information indicative of how much money a particular customer (e.g., the customer selected in portion 520b) has spent with the retailer over a period of time. Information for spending history portion 516b can be generated based on analytics performed on market intelligence data pertaining to the particular customer contained in an in-memory data store. Spending history portion 516b can include a timeline 516b-a, e.g., a representation of the period of time over which spending is tracked. Spending history portion 516b also includes information 516b-b that specifies an average amount of money a particular customer has spent with the retailer over a period of time. Interface 500b also includes portion 518b for display of information indicative of past purchases and/or transactions of a particular customer.

Figure 2:
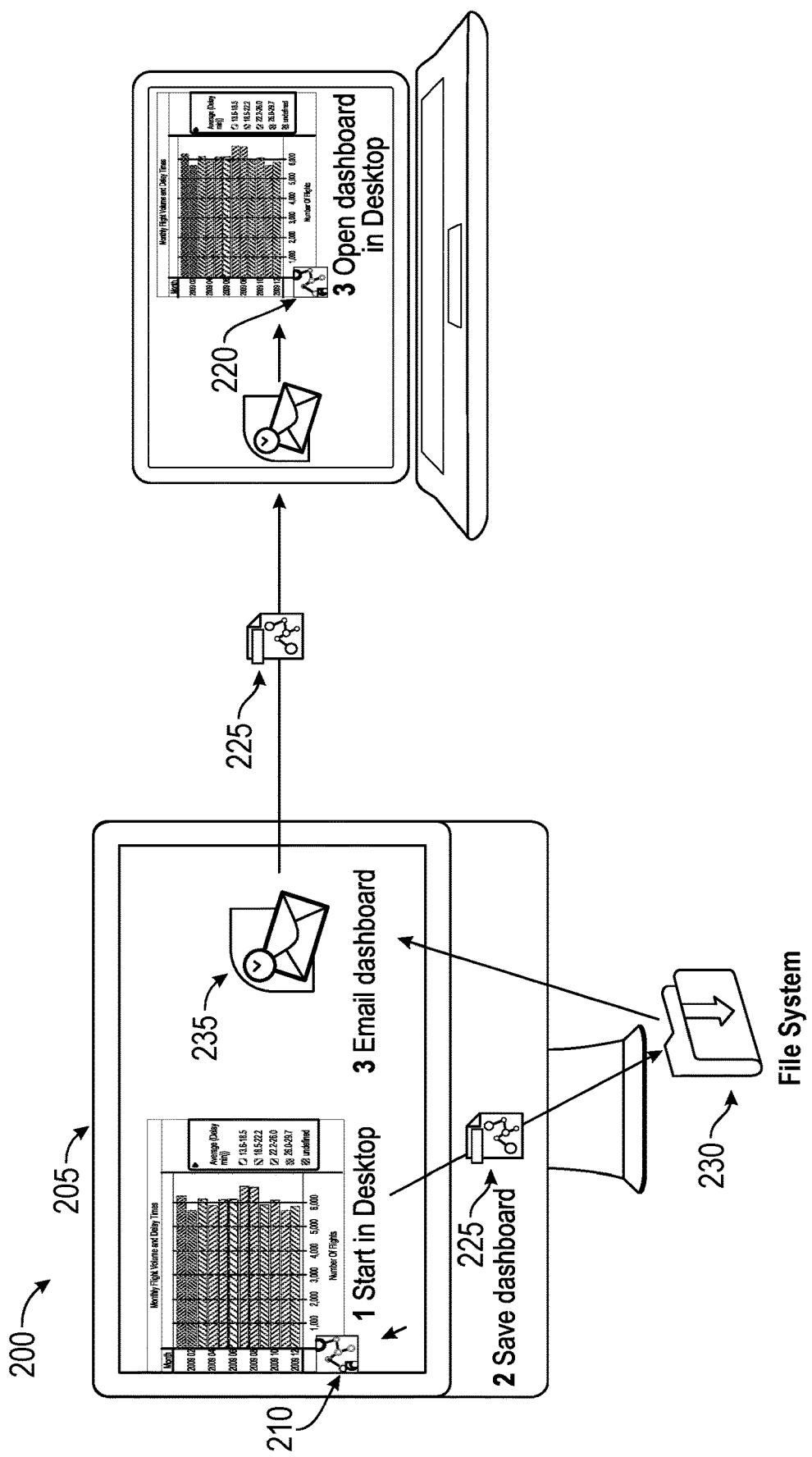
FIGS. 2-7 are diagrams illustrating example systems for enterprise connectivity.

FIG. 2 is a diagram of an example system 200 for enterprise connectivity. System 200 includes a computing device 205 that is running a data analysis application 210 and a computing device 215 that is running a data analysis application 220. The computing devices 205 and 215 are similar to the computing device 105 from FIG. 1. The data analysis applications 210 and 220 are similar to the data analysis application 135 from FIG. 1.

In the example shown in FIG. 2, a user creates a dashboard interface using the data analysis application 210. The user exports the dashboard interface to create a dashboard file 225. The user saves the dashboard file 225 in the file system 230 that is similar to the file system 130 from FIG. 1. The user may access the dashboard file 225 and open the dashboard file 225 in the data analysis application 210. Alternatively, the user may send the dashboard file 225 to another user. For example, the user may send the dashboard file 225 by using an email client 235 or another similar application. The receiving user may open the dashboard file 225 in the receiving user's data analysis application 220 running on the computing device 215. A dashboard file retains the same functionality of the dashboard interface without requiring the user to log into the data analysis server to view the dashboard file. The dashboard file may include the data that that the creator selected for analysis by the dashboard interface. Alternatively, the dashboard file may access the data in the data storage system. To access the data storage system through the data analysis application, the user may be required to log into the data analysis application.

Figure 3:
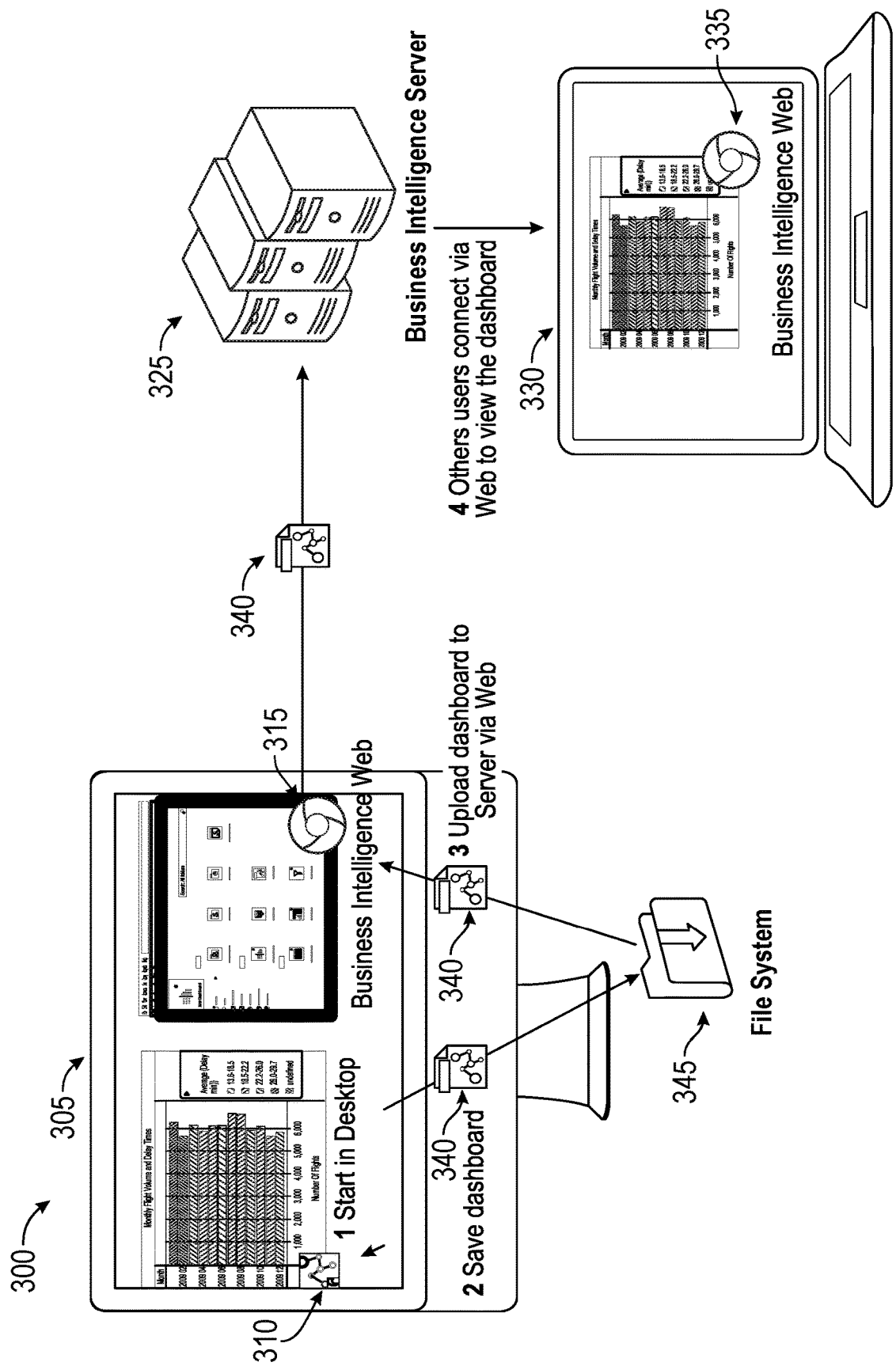

FIG. 3 is a diagram of an example system 300 for enterprise connectivity. System 300 includes a computing device 305 that is running a data analysis application 310 and a browser 315, a data analysis server 325, and a computing device 330 that is running a browser 335. The computing devices 305 and 330 are similar to the computing device 105 from FIG. 1. The data analysis application 310 is similar to the data analysis application 135 from FIG. 1. The data analysis server 325 is similar to the data analysis server 110 of FIG. 1.

In the example shown in FIG. 3, a user creates a dashboard interface using the data analysis application 310. The user exports the dashboard interface to create a dashboard file 340. The user saves the dashboard file 340 in the file system 345 that is similar to the file system 130 from FIG. 1. The user may log into the data analysis server 325 through the browser 315. Through the web interface with the data analysis server 325, the user may upload the dashboard file 340. The user may revise and update the dashboard interface of the dashboard file 340 in the web interface. To share the dashboard file 340, the user may specify other users who may access the dashboard file 340 when it is stored in the data analysis server 325. The access permissions may include edit and view options. A user with permission may log into the data analysis server 325 through the browser 335 that is running on computing device 330. By allowing access to the dashboard file 340 through the data analysis server 325, the user who created the dashboard file 340 may retain ownership and control of the dashboard file 340.

Figure 4:
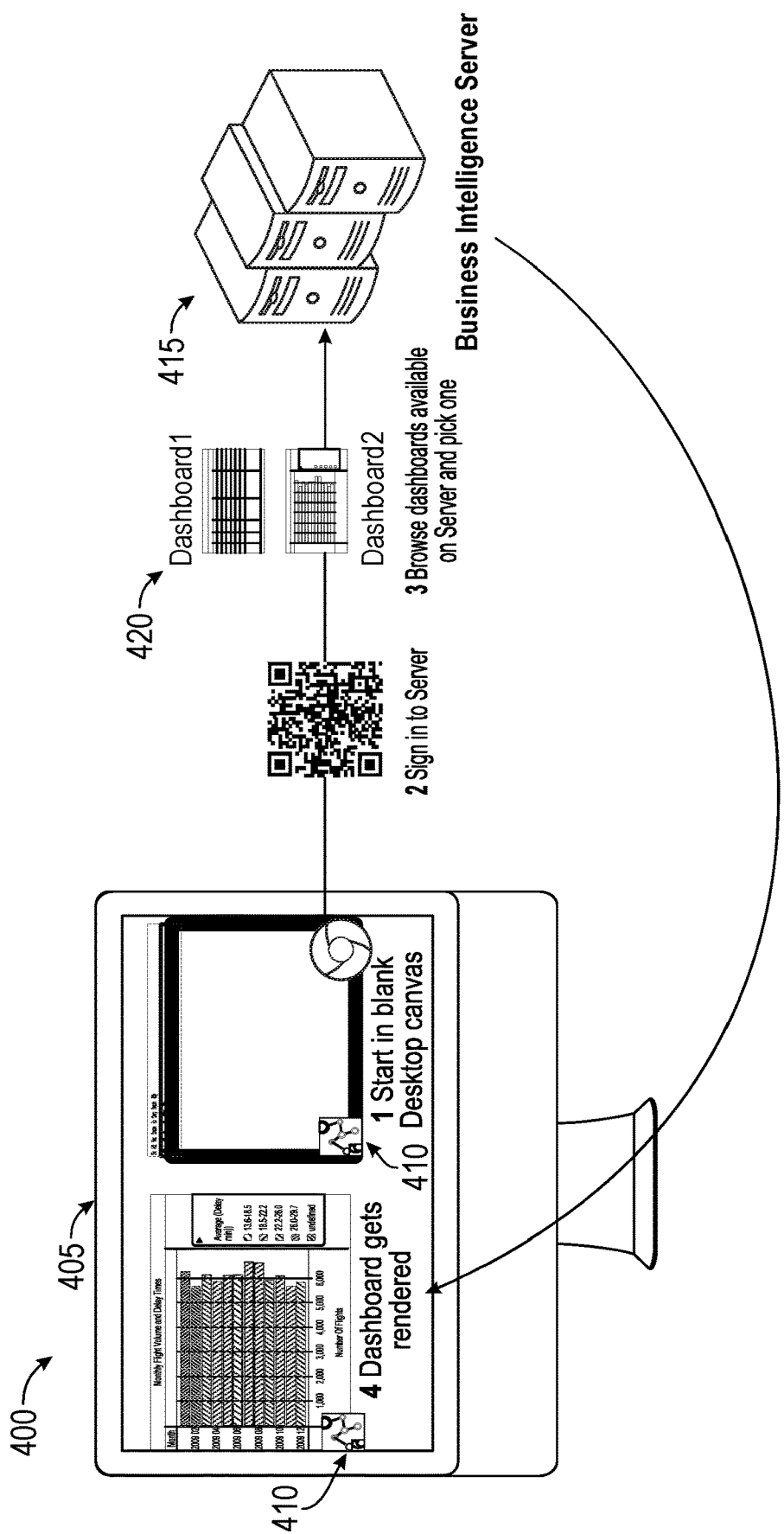

FIG. 4 is a diagram of an example system 400 for enterprise connectivity. System 400 includes a computing device 405 that is running a data analysis application 410 and a data analysis server 415. The computing device 405 is similar to the computing device 105 from FIG. 1. The data analysis application 410 is similar to the data analysis application 135 from FIG. 1. The data analysis server 415 is similar to the data analysis server 110 of FIG. 1.

In the example shown in FIG. 4, a user opens the data analysis application 410 on the computing device 405. Through the data analysis application 410, the user can log into the data analysis server 415 and access a dashboard file 420. The user can download the dashboard file 420 to the computing device 405 and view the corresponding dashboard interface in the data analysis application 410. In some implementations, the dashboard file 420 may include access permissions. The user who saved the dashboard file 420 to the data analysis server 415 may specify the other users who may access the dashboard file 420 when it is stored on the data analysis server 415.

In some implementations, the data stored in a data storage device may include access permissions. A user may be permitted to access, through a browser or a data analysis application, particular portions of data stored in the data storage device after logging into the data analysis server. For example, when accessing sales data, the user may be permitted to only access sales data from the north region and not from the south region. In this instance, another user may create a dashboard interface that includes visualizations for sales data for toys, clothing, and hardware for both the north and south region. The other user may save the dashboard file with permissions for the user who can only access north region data to access the dashboard file. When the user who can only access north region data logs into the data analysis server, the user may view the sales dashboard interface. Instead of viewing the dashboard interface with both north and south region data, the user, who only can access the north region data, views the dashboard interface and only the visualizations for the north data appear, not for the south data.

Figure 5:
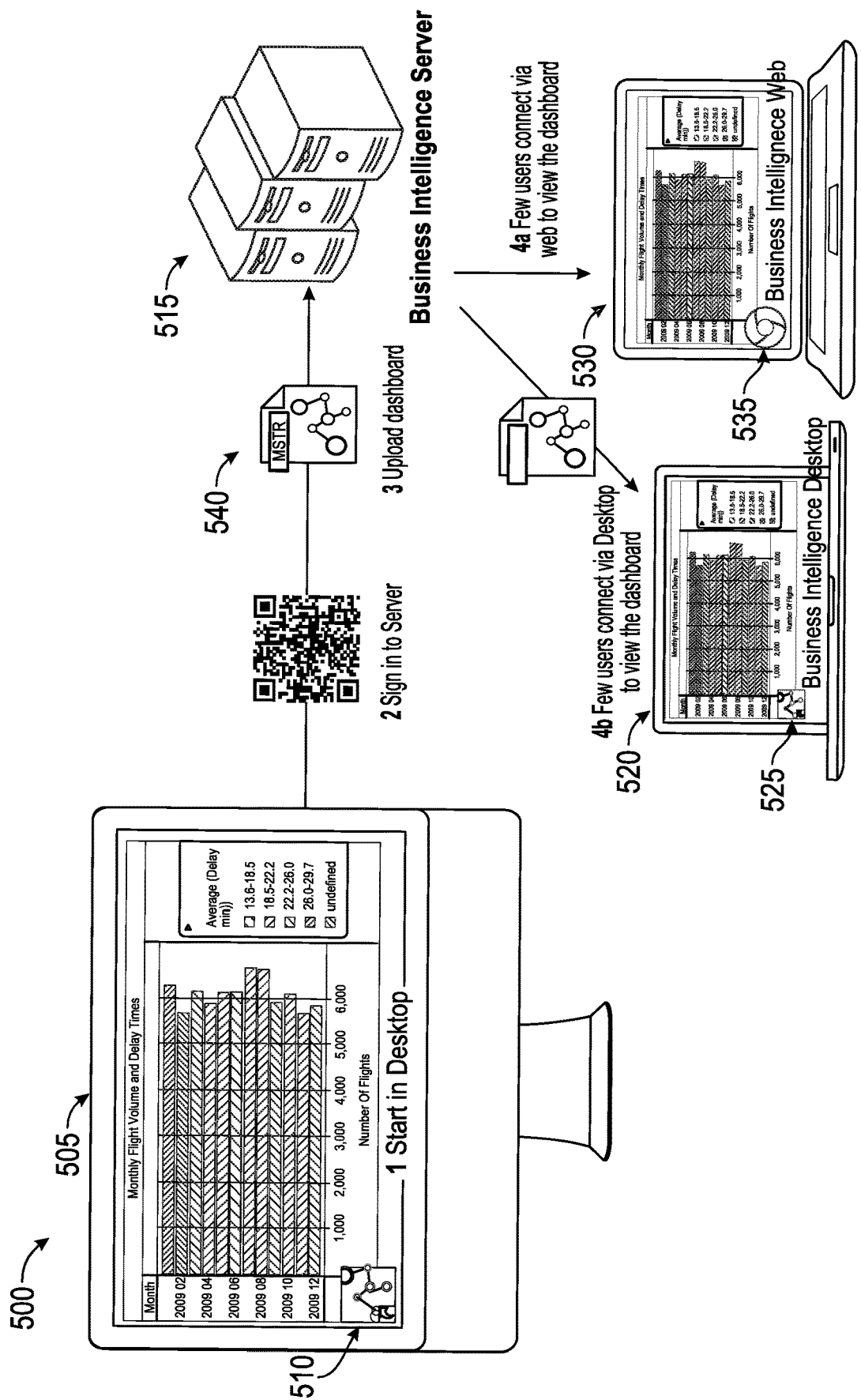

FIG. 5 is a diagram of an example system 500 for enterprise connectivity. System 500 includes computing device 505 that is running a data analysis application 510, a computing device 520 that is running a data analysis application 525, a computing device 530 that is running a browser 535, and a data analysis server 515. The computing devices 505, 520, and 530 are similar to the computing device 105 from FIG. 1. The data analysis applications 510 and 525 are similar to the data analysis application 135 from FIG. 1. The data analysis server 515 is similar to the data analysis server 110 of FIG. 1. The browser 535 is similar to the browser 115 from FIG. 1.

In the example shown in FIG. 5, a user opens the data analysis application 510 on the computing device 505. Through the data analysis application 510, the user can log into the data analysis server 515. The user can create a dashboard interface in the data analysis application 510 and save a dashboard file 540. The user can upload the dashboard file 540 to the data analysis server 515 so that other users may access the dashboard file 540. In some implementations, the user may also select the users who may view or edit the dashboard file 510. A user operating the computing device 520 may use the data analysis application 525 and log into the data analysis server 515. The user operating the computing device 520 may download the dashboard file 540 and view the corresponding dashboard interface using the data analysis application 525. Similarly, a user operating the computing device 530 may use the browser 535 and log into the data analysis server 515 and view the web interface for the data analysis server 515. The user may select the dashboard file 540 from within the web interface and view the corresponding dashboard interface. In some implementations, the user who uploaded the dashboard file 540 may receive a URL from the data analysis server 515. The user may share the URL with other user who can direct their browser to URL to view the dashboard interface or download the dashboard file for viewing by a data analysis application.

Figure 6:
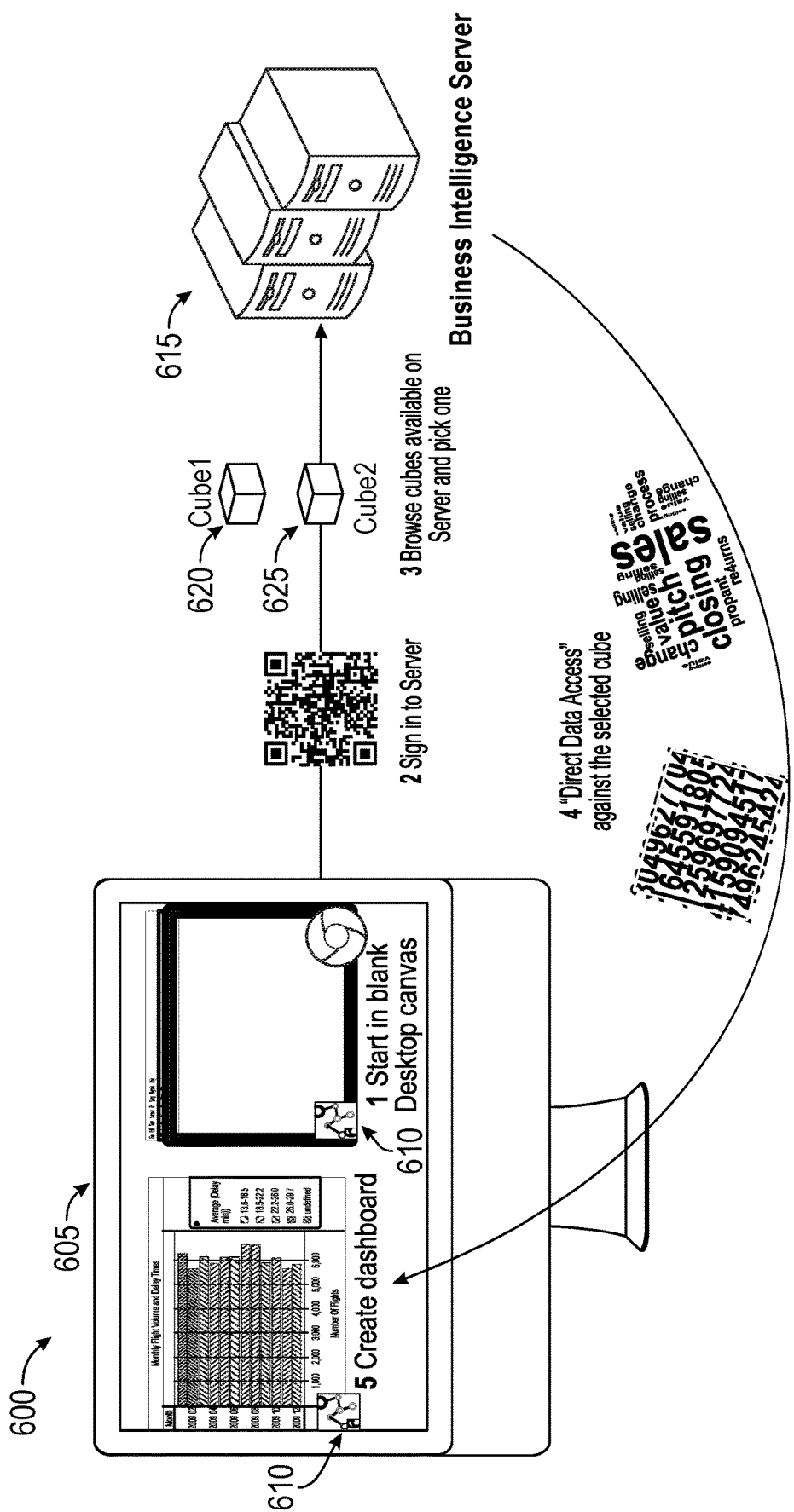

FIG. 6 is a diagram of an example system 600 for enterprise connectivity. System 600 includes computing device 605 that is running a data analysis application 610 and a data analysis server 615. The computing device 605 is similar to the computing device 105 from FIG. 1. The data analysis application 610 is similar to the data analysis application 135 from FIG. 1. The data analysis server 615 is similar to the data analysis server 110 of FIG. 1.

In the example shown in FIG. 6, a user opens the data analysis application 610 on the computing device 605. The user logs into the data analysis server 615 and selects a data cube on which to perform data analysis. A data cube, such as data cube 620 or 625, is a collection of data that a user has stored on the data analysis server 615. In some implementations, this collection of data may be stored on the data storage device or may have been uploaded to the data analysis server 615 from data that was stored locally on computing device 605. The data cube may be accessible to users who have access to the data analysis server 615 through either a web interface or a data analysis application. It may not be necessary to preserve the original source of the data once the data cube is stored on the data analysis server 615. In contrast, if the data cube was stored in the data storage device, then the user would have to have authority to access to the data storage device. For example, a user may access the data storage device and retrieve a collection of data that is relevant to clothing sales from 2014. The user may access the data storage device through the data analysis server 615 or directly through the data storage device. The user can package and label the clothing sales data from 2014 as a data cube 620 and store the data cube 620 in the data analysis server 615. The user may specify particular users to have view and edit permissions. Those users can access the data analysis server 615 to access the data cube 620 of the clothing sales data from 2014. Other users can create and define other data cubes. For example, another data cube 625 may be related to hardware sales from 2012 and 2013.

The user accessing the data analysis server 615 may select the data cube 620. The user may create a dashboard interface in the data analysis application 610, using a similar technique as described above, that includes a visual representation of data in the data cube 620. The dashboard interface may include visualizations from other data cubes such as data cube 625 or other data sources such as the data storage device. The user may then create a dashboard file and share the dashboard file with other users of the data analysis application and web interface as described above.

In some implementations, a user may download the data cube to the user's computing device. For example, the user may download the data cube 625 to the computing device. In this instance, the user may view a dashboard interface based on the data cube 625 without connecting to the data analysis server 615. In some implementations, a user only accesses the data cube on the data analysis sever from the user's computing device. For example, a user may create a dashboard interface based on the data cube 620 without downloading the data cube 620. In this instance, the user or other users who are viewing the dashboard interface, whether from a data analysis application or web interface, would need to access the data analysis server 615 where the data cube 620 is stored to view the dashboard interface.

Figure 7:
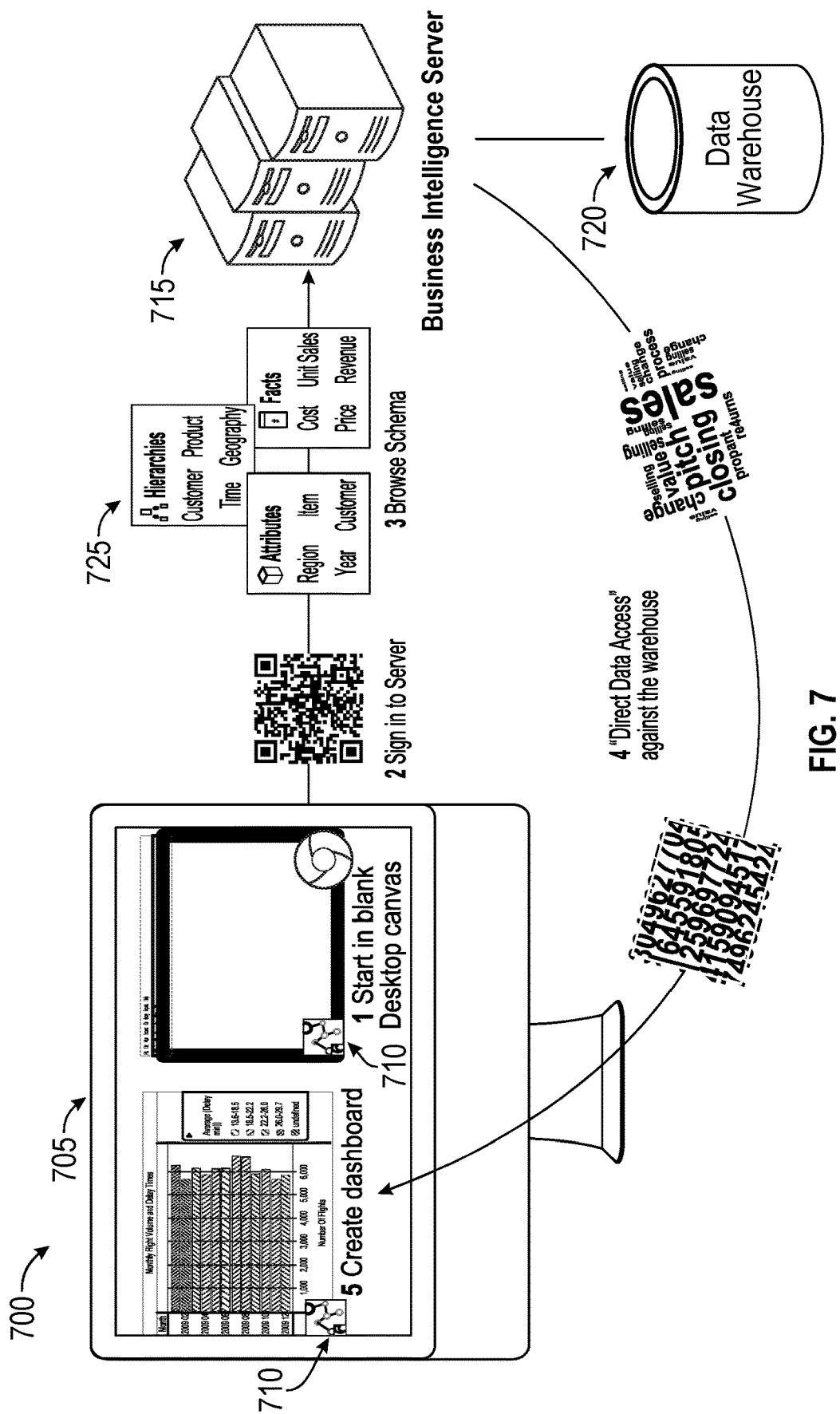

FIG. 7 is a diagram of an example system 700 for enterprise connectivity. System 700 includes computing device 705 that is running a data analysis application 710 and a data analysis server 715. The computing device 705 is similar to the computing device 105 from FIG. 1. The data analysis application 710 is similar to the data analysis application 135 from FIG. 1. The data analysis server 715 is similar to the data analysis server 110 of FIG. 1. The data analysis server 715 may access the data storage device 720.

In the example shown in FIG. 7, a user opens the data analysis application 710 on the computing device 705. The user logs into the data analysis server 715 and browses the schema 725 stored in the data analysis server 715. The schema 725 is a mapping of the data stored in the data storage device 720 and what the data represents. For example, the data storage device 720 may contain tables related to sales of clothing, but the rows and columns may not be consistently labeled. Some tables may contain columns labeled, pants, shirts, slacks, and blouses, all of which relate to clothing. There may be other groups of data that relate to customers, time, geography, or any similar grouping. A user who logs into the data analysis server 715 through the data analysis application 710 may select the some of the objects in the schema and drag the objects to the data analysis application 710. Once the user selects the object from the schema that the user would like to analyze, then the data analysis application 710 may generate queries to access the data from the data storage device 720. The queries may be in a language that the data storage device 720 can understand, such as SQL. When the data analysis application 710 has access to the data returned from the data storage device 720, then the user may generate a dashboard interface based on the accessed data and share a dashboard file with other users.

The schema may include one or more types of schema such as dimensional schema, relational schema and star schema. Dimensional schemas are a type of database schemas that are used for storing and processing historical data. Dimensional schemas can be characterized in terms of facts, measures and dimensions. Facts describe data that can be analyzed, such as sales numbers or cost dollars. For example, facts can be aggregated. Measures are calculations based on facts. On the other hand, dimensions identify and categorize data. For example, dimensions describe data that can be used to generate groups and filters.

A typical relational schema can include definitions for tables within the database, fields of the tables, relationships between the tables, views involving the tables, indexes, functions, and other elements. A dimensional schema, on the other hand, is a type of database schema in which facts or measures that quantify a business are stored separately from descriptive elements (or dimensions) that describe the business. A dimensional schema can be further categorized as a star or snowflake schema, where the objects of the star or snowflake schema are database tables. In some implementations, the dimensional schema can be a single table.

A star schema consists of one or more fact tables referencing a plurality of dimension tables. In general, a fact table consists of the measurements, metrics or facts of a business process. The fact table is typically located at the center of the star schema with the dimension table surrounding the fact table. Dimension tables contain descriptive attributes (i.e. fields). For example, the descriptive attributes are typically textual fields. In a snowflake schema the tables are arranged such that the overall appearance resembles a snowflake shape. In particular, the snowflake schema is represented by centralized fact tables that are connected to multiple dimension tables.

In some implementations, the data analysis server can be extended to receive data arranged in a variety of schemas. For example, the data analysis server can be loaded with multiple star schemas. For example, the data analysis server can be loaded with multiple fact tables and/or fact tables with varying grains, many-to-many (M-M) relationship tables, and entity-relation (ER) model semantics. In this manner, the data analysis server is made to resemble raw data that is staged in-memory.

In some implementations, any arbitrary schema can be loaded into the data analysis server. In some implementations, the data analysis server can be loaded with multiple star schemas and not just a single star schema. A star schema organizes a database such that business process data is separated into facts, which hold measurable, quantitative data about a business, and dimensions which are descriptive attributes related to the facts. For example, facts can include sales price, sale quantity, and time, distance, speed, and weight measurements. Related dimension attribute can include product models, product colors, product sizes, geographic locations, and salesperson names. In one star schema, the data is organize such that the fact table is typically located at the center of the star schema with the dimension table surrounding the fact table. Thus, multiple star schemas can each have a facts table at its center and a plurality of associated dimensional tables surrounding the facts tables.

In some implementations, fact tables at multiple levels can be loaded into the data analysis server. As an illustration, a first star schema can include sales transactions information, including customer information, transaction detail at a timestamp level, and store of purchase information. A second star schema can include store inventory information, such as products information, sales associates' information, and purchase information at a weekly inventory level. A third star schema can include corporate-level pricing data. Thus, each star schema represents data at a different level of granularity and detail. In some implementations, the data analysis server can be loaded with all such star schemas.

Figure 8:
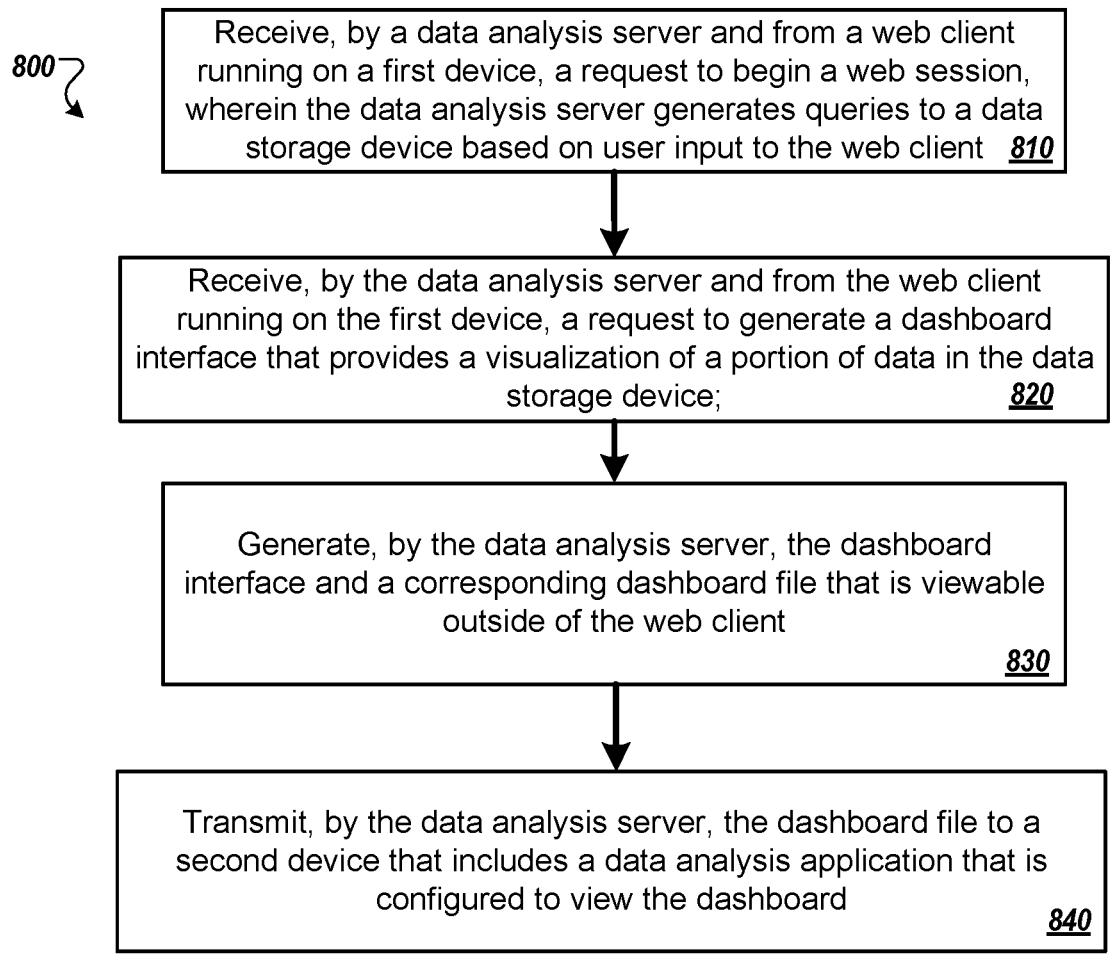
FIG. 8 illustrates an example process for enterprise connectivity.

FIG. 8 illustrates an example process 800 for enterprise connectivity. The operations of the process 800 are described generally as being performed by the server 110 of FIG. 1 or servers from FIGS. 2-7. The operations of the process 800 may be performed by one of the other components of the system shown in FIGS. 1-7 or may be performed by a combination of the components of the systems shown in FIG. 1-7. In some implementations, operations of the process 800 may be performed by one or more processors included in one or more electronic devices.

The server receives, from a web client running on a first device, a request to begin a web session, wherein the data analysis server generates queries to a data storage device based on user input to the web client (810). In some implementations, the server generates SQL queries based on natural language user input. For example, a user may search for sales data from 2014. The server generates an SQL query to retrieve the requested sales data.

The server receives, the web client running on the first device, a request to generate a dashboard interface that provides a visualization of a portion of data in the data storage device (820). In some implementations, the server receives one or more user identifiers of users who are authorized to view the dashboard interface. For example, a user may create a dashboard interface that includes sales data from 2014 and authorize two particular users to view the dashboard interface and three other particular users to edit the dashboard interface. In some implementations, the portion of data is contained in a data cube. The data cube may be data stored locally on the server and includes data predefined by a user. In some implementations, the portion of data is based on schema objects. The schema objects identify and map to data stored in the data storage device. For example, data in the data storage device may be related to sales data but may not include a common label. The schema may include a sales object that links to the sales data in the data storage device. The user may interact with the schema objects and select one or more schema objects to include the data in the dashboard interface.

The server generates the dashboard interface and a corresponding dashboard file that is viewable outside of the web client (830). In some implementations, the server generates the dashboard file after receiving a request from a user. The user may be anyone authorized to view or edit the dashboard interface. In some implementations, the dashboard file may be configured to provide the visualization of the portion of the data in the data storage device without requiring the second device to connect to the data storage device. For example, the data that the dashboard interface visualizes may be stored within the dashboard file or in a file attached to the dashboard file. In this instance, a user may view the dashboard interface without connecting directly or indirectly to the data storage device. The server transmits the dashboard file to a second device that includes a data analysis application that is configured to view the dashboard file (840). In some implementations, the data analysis application is configured to run outside of a browser.

With respect to each of the systems for enterprise connectivity described above, the system is configured to allow the user to create a dashboard interface that references cached data. The cached data may be data that the user selects. For example, the user may select to cache sales data for 2014 and 2015 in preparation for creating a dashboard that illustrates various analytics performed on the sales data for 2014 and 2015. The system may also identify the appropriate data to cache based on the dashboard interface created by the user. For example, the user may create a dashboard that illustrates various analytics performed on sales data for the southern region for 2010 to 2015. The system may then identify the sales data for the southern region for 2010 and 2015 and store it in the local cache. In some implementations, the system may determine to cache all the sales data for 2010 to 2015 depending on the storage capabilities of the local system compared to the amount of data to be cached. For example, the sales data for 2010 to 2015 is two hundred megabytes and the sales data for the southern region during that same time period is fifty megabytes. The system then compares two hundred megabytes and fifty megabytes to the storage capability of the system which may include one thousand megabytes of open storage space. The system may determine to cache all of the sales data for 2010 to 2015. In some implementations, the system may prompt the user for the amount of data to cache. For example, the system may prompt the user to cache the 2010 to 2015 sales data all regions or just the southern regions. Knowing the capabilities of the network and the users with whom the dashboard creator intends to share the dashboard, the dashboard creator may select the smaller data size. When the creating user shares the dashboard with other users, the dashboard may include the cached data so other users can view the dashboard offline. When the creating user or the other users are online, the dashboard may access updated information from the server and generate updated dashboard visualizations, thus allowing flexibility in creating dashboards and consistency when viewing dashboards.

When working with cached data, the local system does not need to access the network and can generate dashboard interfaces and analyze the cached data more quickly than if the system accessed online data. The user creating user may also periodically access the server to update the cached data. For example, the user may work on configuring a dashboard over a three day period. At the beginning of each day, the user may update the cached data and then work offline the rest of the day.

Each of the systems may also be configured to allow a user to create a dashboard offline, or without access to the data server. The user may create placeholders for different dashboard items and request that the dashboard items access particular data when the creating user or other users view the dashboard while having access to the data server. For example, the creating user may create, while offline, a dashboard item to illustrate sales trends for jackets and shoes for the northern region for 2010 to 2015. The creating user may share the dashboard with other users. When the creating user or the other users view the dashboard, the dashboard accesses the sales data for jackets and shoes for 2010 and 2015 and generates the visual interface. When the creating user creates the dashboard without access to the server and without cached data, the dashboard includes instructions for what data to access from the server once views online.

Each of the systems may also be configured to allow the user to take snapshots of current data while creating a dashboard. The dashboard maintains the illustration of the snapshot data even when the data updates. For example, a user may create a dashboard item using a snapshot of sales data for 2016. The user shares the dashboard with other users who view the dashboard one week later. The other users view the dashboard and view the 2016 sales data item using the week-old data that the creating user originally used when creating the dashboard. The snapshot is in contrast to the dashboard accessing the latest online data instead of the old data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a data analysis server and from a web application accessed through a browser running on a first device, a request to begin a web session between the data analysis server and the web application;
   receiving, by the data analysis server and from the web application, a request to generate a dashboard interface that provides a visualization of data from a dataset stored in a data storage device, wherein the request to generate the dashboard interface includes a label specified by user input and a visual format specified by user input, and the data analysis server includes a schema that maps labels to respective portions of the dataset stored in the data storage device;
   based on the request to generate the dashboard interface, generating, by the data analysis server, one or more queries that request the portions of the dataset that are mapped to the label by the schema;
   receiving, from the data storage device, a subset of the dataset including the portions of the dataset that are mapped to the label by the schema;
   generating, by the data analysis server, a dashboard file including the subset of the dataset and data indicating the visual format specified by user input, wherein the dashboard file enables a client device to generate the dashboard interface that provides a visualization of the subset of the dataset in the visual format specified by user input; and
   transmitting, by the data analysis server, the dashboard file to a second device for presentation.

2. The method of claim 1, wherein the second device includes a data analysis application that is configured to present the dashboard file.

3. The method of claim 2, wherein the data analysis application is configured to view the dashboard interface by opening the dashboard file and bypassing accessing the data storage device.

4. The method of claim 1, wherein the dashboard file includes the data stored in the data storage device.

5. The method of claim 1, comprising:
   receiving, by the data analysis server, data indicating edits made to the dashboard interface of the dashboard file by a user of the second device, wherein the second device was not in communication with the data analysis server during editing of the dashboard interface;
   based on receiving the data indicating the edits made to the dashboard interface of the dashboard file, generating, by the data analysis server, an updated dashboard file that enables a client device to generate an updated dashboard interface; and
   providing, by the data analysis server and to the second device, the updated dashboard file.

6. The method of claim 1, comprising:
   receiving, by the data analysis server and from the web application, a natural language query,
   wherein generating the one or more queries that request the portions of the dataset that are mapped to the label by the schema comprises generating one or more SQL queries based on the natural language query.

7. The method of claim 1, wherein:
   receiving the request to generate the dashboard interface that provides the visualization of the data from the dataset stored in the data storage device comprises receiving an identifier of a user who is authorized to receive the dashboard file, and generating the dashboard file that enables a client device to generate the dashboard interface comprises generating the dashboard file with permissions that prevent users other than the user from viewing the dashboard interface.

8. A system comprising:

one or more computers; and one or more computers and one or more storage devices storing instructions that are operable, when executed by the one or more computers, to cause the one or more computers to perform operations comprising:

receiving, by a data analysis server and from a web application accessed through a browser running on a first device, a request to begin a web session between the data analysis server and the web application;

receiving, by the data analysis server and from the web application, a request to generate a dashboard interface that provides a visualization of data from a dataset stored in a data storage device, wherein the request to generate the dashboard interface includes a label specified by user input and a visual format specified by user input, and the data analysis server includes a schema that maps labels to respective portions of the dataset stored in the data storage device;

based on the request to generate the dashboard interface, generating, by the data analysis server, one or more queries that request the portions of the dataset that are mapped to the label by the schema;

receiving, from the data storage device, a subset of the dataset including the portions of the dataset that are mapped to the label by the schema;

generating, by the data analysis server, a dashboard file including the subset of the dataset and data indicating the visual format specified by user input, wherein the dashboard file enables a client device to generate the dashboard interface that provides a visualization of the subset of the dataset in the visual format specified by user input; and transmitting, by the data analysis server, the dashboard file to a second device for presentation.

9. The system of claim 8, wherein the second device includes a data analysis application that is configured to present the dashboard file.

10. The system of claim 9, wherein the data analysis application is configured to view the dashboard interface by opening the dashboard file and bypassing accessing the data storage device.

11. The system of claim 8, wherein the dashboard file includes the data stored in the data storage device.

12. The system of claim 8, wherein the operations comprise:

receiving, by the data analysis server, data indicating edits made to the dashboard interface of the dashboard file by a user of the second device, wherein the second device was not in communication with the data analysis server during editing of the dashboard interface;

based on receiving the data indicating the edits made to the dashboard interface of the dashboard file, generating, by the data analysis server, an updated dashboard file that enables a client device to generate an updated dashboard interface; and providing, by the data analysis server and to the second device, the updated dashboard file.

13. The system of claim 8, wherein the operations comprise:

receiving, by the data analysis server and from the web application, a natural language query, wherein generating the one or more queries that request the portions of the dataset that are mapped to the label by the schema comprises generating one or more SQL queries based on the natural language query.

14. The system of claim 8, wherein:

receiving the request to generate the dashboard interface that provides the visualization of the data from the dataset stored in the data storage device comprises receiving an identifier of a user who is authorized to receive the dashboard file, and generating the dashboard file that enables a client device to generate the dashboard interface comprises generating the dashboard file with permissions that prevent users other than the user from viewing the dashboard interface.

15. A non-transitory computer-readable medium storing software comprising instructions executable by one or more computers which, upon such execution, cause the one or more computers to perform operations comprising:

receiving, by a data analysis server and from a web application accessed through a browser running on a first device, a request to begin a web session between the data analysis server and the web application;

receiving, by the data analysis server and from the web application, a request to generate a dashboard interface that provides a visualization of data from a dataset stored in a data storage device, wherein the request to generate the dashboard interface includes a label specified by user input and a visual format specified by user input, and the data analysis server includes a schema that maps labels to respective portions of the dataset stored in the data storage device;

based on the request to generate the dashboard interface, generating, by the data analysis server, one or more queries that request the portions of the dataset that are mapped to the label by the schema;

receiving, from the data storage device, a subset of the dataset including the portions of the dataset that are mapped to the label by the schema;

generating, by the data analysis server, a dashboard file including the subset of the dataset and data indicating the visual format specified by user input, wherein the dashboard file enables a client device to generate the dashboard interface that provides a visualization of the subset of the dataset in the visual format specified by user input; and transmitting, by the data analysis server, the dashboard file to a second device for presentation.

16. The medium of claim 15, wherein the second device includes a data analysis application that is configured to present the dashboard file.

17. The medium of claim 15, wherein the dashboard file includes the data stored in the data storage device.

18. The medium of claim 15, wherein the operations comprise:

receiving, by the data analysis server, data indicating edits made to the dashboard interface of the dashboard file by a user of the second device, wherein the second device was not in communication with the data analysis server during editing of the dashboard interface;

based on receiving the data indicating the edits made to the dashboard interface of the dashboard file, generating, by the data analysis server, an updated dashboard file that enables a client device to generate an updated dashboard interface; and providing, by the data analysis server and to the second device, the updated dashboard file.

19. The medium of claim 15, wherein the operations comprise:

receiving, by the data analysis server and from the web application, a natural language query, wherein generating the one or more queries that request the portions of the dataset that are mapped to the label by the schema comprises generating one or more SQL queries based on the natural language query.

20. The medium of claim 15, wherein:

receiving the request to generate the dashboard interface that provides the visualization of the data from the dataset stored in the data storage device comprises receiving an identifier of a user who is authorized to receive the dashboard file, and generating the dashboard file that enables a client device to generate the dashboard interface comprises generating the dashboard file with permissions that prevent users other than the user from viewing the dashboard interface.

* * * * *